United States Patent [19]

Kenney

[11] 3,912,858

[45] Oct. 14, 1975

[54] DEVICE FOR THE DETECTION OF SIGNAL DROP-OUTS

[75] Inventor: George Churchill Kenney, Briarcliff Manor, N.Y.

[73] Assignee: North American Philips Corporation, New York, N.Y.

[22] Filed: Apr. 29, 1974

[21] Appl. No.: 464,842

[30] Foreign Application Priority Data

Feb. 14, 1974 Netherlands ....................... 7402014

[52] U.S. Cl. ...... 178/6.6 R; 178/6.6 DC; 178/6.7 A; 179/100.3 V; 360/38

[51] Int. Cl.[2] ............................................ H04N 5/76

[58] Field of Search ...................... 360/38; 358/4, 8; 178/6.6 R, 6.6 DC, 6.7 A; 179/100.3 V, 100.4 R, 100.4 M, 100.41 L

[56] References Cited

UNITED STATES PATENTS 13,824,620 7/1974 Langer ................................. 360/38

OTHER PUBLICATIONS

W. Vanden Bussche et al., Signal Processing in the Philips "VLP" System, Philips Tech. Rev. 33, 181–185, 1973 No. 7.

IRE Transactions, Vol. II–6, No. 3 6/60.

*Primary Examiner*—Raymond F. Cardillo, Jr.
*Attorney, Agent, or Firm*—Frank R. Trifari; Simon L. Cohen

[57] ABSTRACT

A device for detecting small signal drop-outs in a video signal. The difference of the demodulated luminance signals of two consecutive lines is determined continually. By means of a signalling circuit the presence of a wavefore is detected which is specific for the occurrence of a signal drop-out, which signalling circuit then supplies an activating pulse for a compensation device. The device is of special importance for reading a disk-shaped record carrier in which the video signal is stored in optically coded form in a trackwise pattern of blocks and areas of variable length, because the relevant signal drop-outs are likely to occur in this case.

10 Claims, 10 Drawing Figures

DEVICE FOR THE DETECTION OF SIGNAL DROP-OUTS

Figure 1:
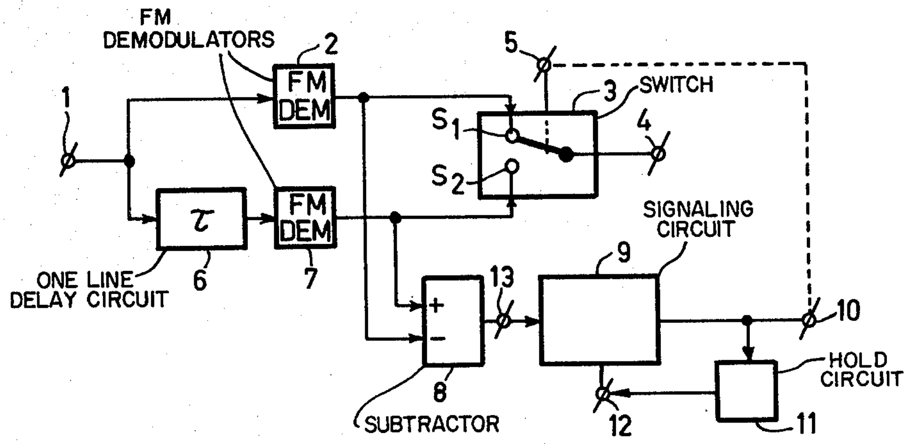

The invention relates to a device for the detection of signal drop-outs in a video signal, which signal comprises a carrier which is frequency-modulated with the luminance information, in particular a video signal which is read from a disk-shaped record carrier on which information is stored in optically coded form in a trackwise pattern of blocks and areas of variable length.

Such devices are employed to achieve drop-out compensation in conjunction with a drop-out compensation device. In this respect a signal drop-out is to be understood to mean not only a complete signal failure but also any disturbance which occurs in the desired signal. Generally a delay line with a delay of one line time of the television signal is used for the compensation of signal drop-outs. Upon the occurrence of a signal drop-out the signal which has been delayed by one line time instead of the disturbed signal which is available at that instant is applied to the reproduction equipment by means of a switch, so that during a signal drop-out the disturbed information of the one television line is replaced by the information of the preceding line. Said switch is activated by the detection device mentioned in the preamble, which must detect the occurrence of a signal drop-out.

For the detection of said signal drop-outs a number of different methods are known. A common property of said known methods is that they are only capable of detecting drop-outs larger than a certain minimum magnitude. One of these known methods for example employs filter means, by means of which it is ascertained whether the applied video signal contains signal components outside the frequency bands normally occupied by the modulated carrier and other desired signal components. Such a component is an indication of a disturbance. However, said method does not enable the detection of a signal drop-out which causes a signal component of, for example, a frequency within the frequency band occupied by the modulated carrier. Consequently, such signal drop-outs are not compensated by the associated signal drop-out compensation circuit. Especially, when reproducing a color television signal, even these relatively small signal drop-outs may give rise to annoying disturbances in the reproduced signal, in particular the color signal.

It is an object of the invention to provide a device which allows said small signal drop-outs to be detected and thus to be compensated for. The device according to the invention is therefore characterized in that it is provided with a first delay line having a delay time equal to one line time, a demodulator circuit for demodulating the luminance signal contained in the modulated carrier, a subtractor circuit for subtracting said luminance signal and the luminance signal which is delayed by one line time by the first delay line from each other, a signalling circuit, to which the output signal of the subtractor circuit is applied and which, at its output supplies a signalling pulse if the signal applied to its input passes through a full period of an at least approximately sinusoidal signal within a certain constant time interval, an inhibiting circuit, which establishes the connection between the output of the signalling circuit and the output terminal of the device, and a hold circuit whose input is connected to said output terminal and which upon the occurrence of a signalling pulse at said output terminal supplies a hold pulse, which pulse is delayed by one line time and of a pulse duration equal to that of the signalling pulse, which hold pulse is fed to a control input of the inhibiting circuit, so that during said hold pulse no further signalling pulse can reach the output terminal.

The invention is based on the recognition that part of the small signal drop-outs, a substantial part in the case of the disk-shaped record carrier mentioned in the preamble cause a signal disturbance in the demodulated luminance signal which disturbance has a definite signal waveform, namely a full period of an at least approximately sinusoidal signal of a fixed period. In the case of the disk-shaped record carrier mentioned in the preamble said small signal drop-outs are found to be caused by a shift of one transition between a block and an area. The magnitude of said shift appears to have only a slight influence on the period of the said signal disturbance in the demodulated luminance signal and to determine substantially only the amplitude of said signal disturbance. The period appears to depend almost exclusively on the filters used for demodulating the modulated carrier.

The signalling circuit may take various forms. For example use can be made of a so-called "matched filter". A preferred embodiment of the signalling circuit comprises a first threshold detector with a present positive threshold value, to which the output signal of the subtractor circuit is applied and whose output is connected to a first monostable multivibrator, a second threshold detector with a present negative threshold value, to which the output signal of the subtractor circuit is applied and whose output is connected to a second monostable multivibrator, and a logic circuit with a first input, connected to the output of the first monostable multivibrator, and a second input, connected to the output of the second monostable multivibrator, a signalling pulse being available at the output of said logic circuit if simultaneously a pulse appears at its two inputs. The two monostable multivibrators are then designed so that they supply pulses of a duration which is for example 10 to 20 percent greater than half the period of the waveform anticipated during a signal drop-out.

The hold circuit may be very simple and merely comprise a delay line with a delay of one line time. If the inhibit time of the inhibiting circuit is to be selected so as to differ from that of the signalling pulse, the hold circuit may, of course, be provided with a monostable multivibrator which supplies a pulse of the desired duration.

The detection device according to the invention is preferably employed for activating a signal drop-out compensation device for the chrominance signal contained in the video signal, because these relatively small signal drop-outs are mainly disturbing in the reproduced chrominance signal, but may also be used for activating a signal drop-out compensation device for the luminance signal.

Figure 2:
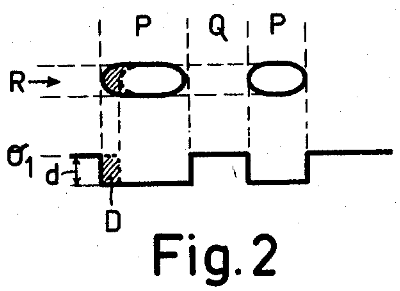
Figure 3:
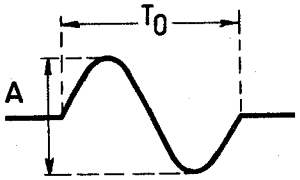
Figure 5:
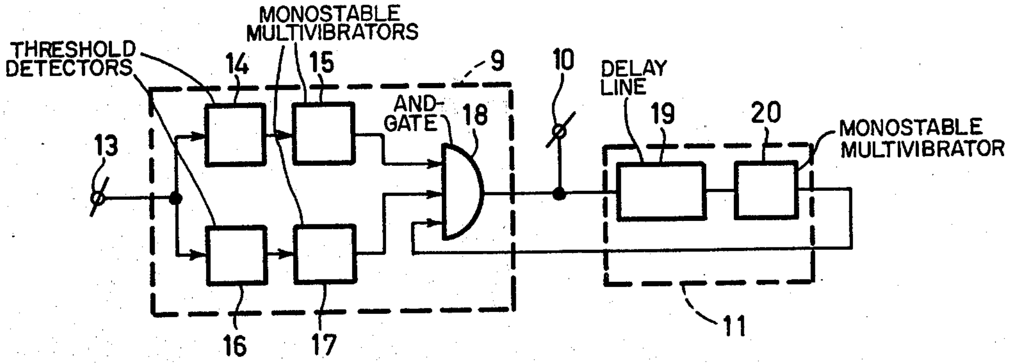
Figure 6A:
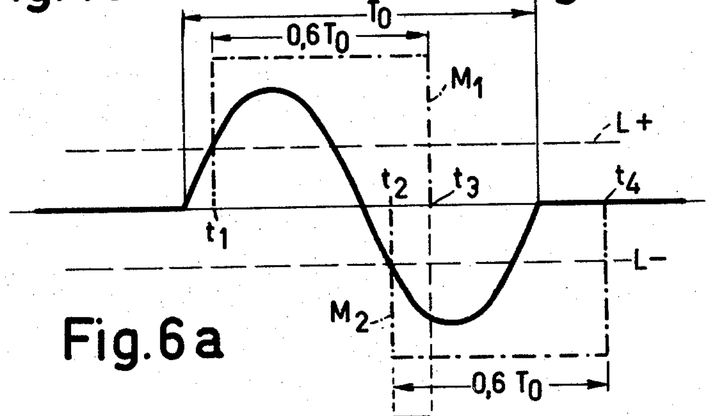
Figure 6B:

The invention will be described in more detail with reference to the Figures, of which FIG. 1 shows an embodiment of the device according to the invention, FIG. 2 shows a part of a track of a disk-shaped record carrier for which the device according to the invention is intended in particular, FIG. 3 shows a specific waveform occurring during a small signal drop-out, FIGs. 4*a*–4*d* show a number of explanatory waveforms associated with the embodiment of FIG. 1, FIG. 5 shows an embodiment of the signalling circuit, and FIGs. 6*a*–6*b* show an explanatory waveform associated therewith.

FIG. 1 schematically shows the signal drop-out detection device according to the invention. The modulated carrier containing the luminance information which has been extracted from the received video signal, is fed to an input terminal 1, which is connected to an FM demodulator circuit 2, by means of which the luminance signal is obtained. The input terminal 1 is also connected to a delay line 6, which introduces a delay of one line time and which supplies the delayed signal to an FM demodulator circuit 7. Thus, a luminance signal which lags the luminance signal at the output of the FM demodulator 2 by one line time is obtained at the output of said FM demodulator 7.

Said device with the delay line 6 is frequently used for obtaining a signal drop-out compensation. For this purpose a switch 3 is then provided having two inputs $S_1$ and $S_2$, of which the input $S_1$ is connected to the FM demodulator 2 and the input $S_2$ to the FM demodulator 7 and whose output constitutes an output terminal 4 of the drop-out compensation device. Normally, the input $S_1$ is connected to said output terminal 4, so that at said output terminal the demodulated luminance signal is available. However, if a signal drop-out occurs, the switch 3 is changed over by a command signal from a signal drop-out detector which is applied to a control terminal 5 and the input $S_2$ is connected to the output terminal 4. A a result, the luminance signal which has been delayed by one line time then takes the place of the disturbed luminance signal during said signal drop-out.

The exact arrangement of said device is further immaterial. Various arrangements with a delay line and FM demodulators are known for obtaining the desired signals.

For the signal drop-out detector according to the invention it is only of importance that always an undelayed luminance signal and a luminance signal delayed by one line time are available simultaneously. These two luminance signals, i.e. the output signals of the FM demodulators 2 and 7, are fed to a subtractor circuit 8, at whose output the difference between these two signals becomes available. Said difference signal is fed to a signalling circuit 9, which serves to detect a certain specific waveform in the signal at the terminal 13 and subsequently to supply a signalling pulse to an output terminal 10. Said signalling pulse may be used for activating a signal drop-out compensation device. For the compensation of signal drop-outs in the luminance signal said signalling pulses at terminal 10 may be applied to the control terminal 5 of the switch 3, as is shown dotted. For the compensation of disturbances in the chrominance signal contained in the video signal owing to said signal drop-outs, an additional compensation circuit must be provided, to which the chrominance signal is applied and which also derives its command pulses from the output terminal 10. The signalling pulse at the output terminal 10 is also fed to a hold circuit 11, which supplies a control signal to a hold input 12 of the signalling circuit 9. The function and operation of said signalling circuit 9 and the hold circuit 11 will be described in more detail with reference to the FIGS. 2, 3 and 4.

As already stated, the signal drop-out detection device according to the invention is of special significance in reading a disk-shaped record carrier, on which the information is stored in optically coded form in a trackwise pattern of blocks and areas of variable length. Such a record carrier is described in Netherlands Patent Specification 7,102,866 corresponding to U.S. patent application Ser. No. 229,285, filed Feb. 25, 1972, now abandoned in favor of U.S. patent application Ser. No. 396,399, filed Sept. 12, 1973. The blocks and areas may then consist of light-transmitting and light-absorbing areas or have a high-low structure as in FIG. 2. FIG. 2 shows a part of a track R in top plan view and in cross-section, containing blocks P of variable length, alternating with areas Q of variable length. Said alternation of blocks and areas is obtained by pressing pits P in the surface $O_1$ of a flat disk, the bottom of each pit being situated at a depth *d* below the surface $O_1$ of the disk. Such a high-low structure can be read with the aid of a light beam focussed onto the track.

It appears that small signal drop-outs in a video signal which is read from such a record carrier are mainly caused by a flaw in one of the walls of a pit P, which schematically shown in the Figure by the hatched part D. Such flaws may be the result of irregularities during pressing of the disk. However it has also been found that this type of flaws in the record carrier result in a specific disturbance. A signal drop-out, in the demodulated luminance signal, namely a disturbance with a waveform as shown in FIG. 3. Said disturbing signal covers the full period of an at least approximately sinusoidal signal, the sequence of the two half periods being arbitrary. It appears that the duration $T_0$ of said period is virtually independent of the magnitude of the disturbance D, but that only the amplitude A of the disturbing signal depends on the magnitude of said disturbance D. The duration $T_0$ is determined by the low-pass filters employed in the FM demodulator for the luminance signal.

The invention utilizes said specific waveform of said disturbing signal for the detection of the signal drop-out, because it is found that in practice the period $T_0$ corresponds to a frequency which is situated at least at the edge of the frequency band occupied by the luminance signal. A practical value for $T_0$ was for example 400 nsecs, which corresponds to a frequency of 2.5 MHz. The occurrence of the shown waveform is therefore already a very reliable indication of the presence of a signal drop-out, whilst moreover in most cases a distinction can be made between a signal component of said waveform and a signal drop-out, as will be explained hereinafter with reference to FIG. 4.

Figure 4A:
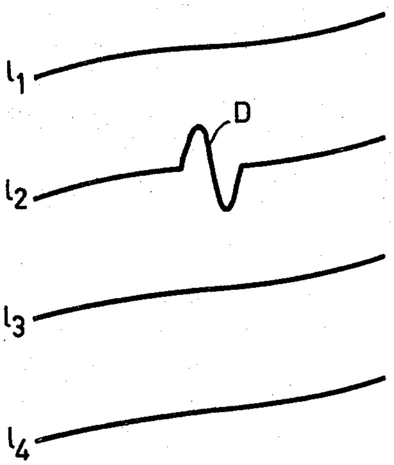

FIG. 4*a* by way of example shows the shape of the luminance signal for four consecutive lines $l_1$, $l_2$, $l_3$ and $l_4$. For simplicity it is assumed that the luminance signal is a low frequency signal, i.e. changes gradually. This is also the situation in which a signal drop-out is most disturbing. It is assumed that in the second line $l_2$ a signal drop-out D occurs, which consequently has a waveform corresponding to that of FIG. 3, which waveform, of course, may also be first negative and then positive.

Figure 4B:
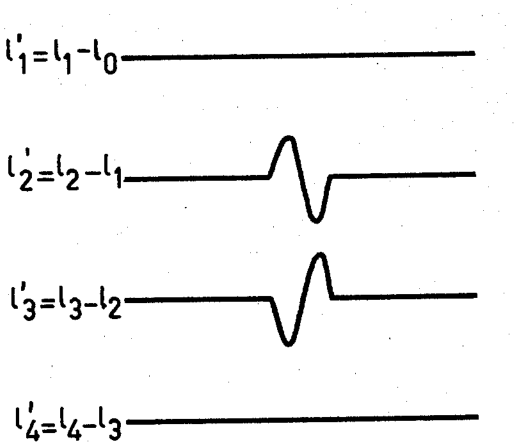

With the aid of the subtractor circuit 8 the difference between the luminance signals of two consecutive lines is determined continually, which results in the waveform of FIG. 4*b*, the signal of the line $l_n$, corresponding to the difference between the signals of the lines $l_n$ and $l_{n+1}$, for n = 1, 2, 3 and 4. These waveforms show that now both the line $l_2'$ and the line $l_3'$ contain the waveform which is typical of the relevant signal drop-outs.

Figure 4C:
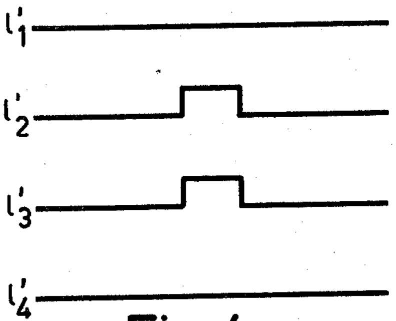
Figure 4D:
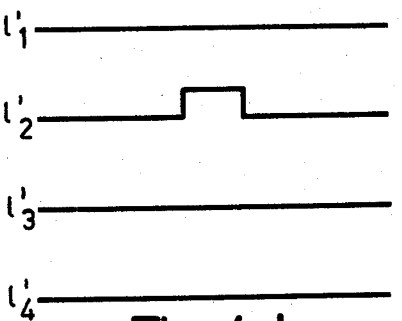

This specific waveform is detected with the aid of the signalling circuit 9. Said signalling circuit supplies a signalling pulse to the output terminal 10 as soon as the signal applied to its input exhibits the relevant specific waveform. In the present example a signalling pulse will therefore appear at the output of said signalling circuit during the line $l_2'$ and during the line $l_3'$ as is shown in FIG. 4*c*.

The occurrence of the signalling pulse during the line $l_2'$ is perfectly correct, because said pulse rightly indicates the appearance of a signal drop-out during the line $l_2$. The signalling pulse during the line $l_3'$, however, would indicate a drop-out during the line $l_3$, whilst said pulse in reality results from the drop-out during the line $l_2$, namely as a result of the subtraction operation. In order to assure a correct detection of the signal drop-outs said second pulse must be suppressed. This is effected with the aid of the hold circuit 11. Said hold circuit receives the first signalling pulse during the line $l_2'$ and then ensures that the signalling circuit is blocked during a time interval of the same duration as the signalling pulse, which time interval relative to said applied signalling pulse is delayed by one line time. Consequently, said time interval exactly corresponds to the signalling pulse during the line $l_3'$ shown in FIG. 4*c*. Thus, said pulse is prevented from reaching the output terminal 10, so that the signal at said output terminal 10 will have the shape of FIG. 4*d*.

Thus, said signal at the output terminal 10 in a correct manner indicates the appearance of a signal drop-out and may therefore be employed for activating a signal drop-out compensation circuit, preferably a compensation circuit for signal drop-outs which appear in the chrominance signal. Such a compensation circuit may have any known arrangement and may for example consist of a delay line with a delay of one line time and a switch which is actuated by the signalling pulses at the output terminal 10, so that the chrominance signal is transferred to the reproducing apparatus either directly or with a delay of one line time. In the case of a PAL colour television signal the phase of the chrominance signal must then be adapted, which may for example be effected in a manner as described in Netherlands Patent Application No. 7,309,910 corresponding to U.S. patent application Ser. No. 484,280, filed June 28, 1974. Upon the occurrence of a signal drop-out it is also possible to switch the chrominance signal to a reference level, for example ground, since no color is less disturbing than an incorrect color.

If the waveform occurring during the line $l_2$ of FIG. 4*a* should not be the result of a signal drop-out but of a high frequency luminance signal, a signal drop-out would be detected erroneously, thus causing erroneous compensation. However, this type of high-frequency signal waveforms generally occurs if the reproduced picture contains vertical or oblique patterns. However, in the event of this type of patterns the same signal components occur at approximately the same horizontal position during two consecutive lines, so that subtraction of said signal component in any case does not frequently give rise to the specific waveform in the difference signal and this type of signal component consequently does not give rise to signalling pulses.

A different situation may occur if the luminance signal of two consecutive lines at a given instant just differs in such a way that the signal supplied to the signalling circuit 9 by the subtractor circuit 8 exactly has the waveform which is specific of a signal drop-out. This would also give rise to erroneous drop-out detection. If the detection device is used for actuating a signal drop-out compensation device for the luminance signal, the vertical resolution in said rare situation will be halved. This situation does not adversely affect the chrominance signal, because in the case of such a high-frequency video signal there is generally no chrominance component, as a result of the limited bandwidth selected for the chrominance signal.

The signalling circuit 9 may take various forms. In a first possibility use canbe made of a so-called "matched filter". Such a filter generally employs a delay device, which has been branched at various points, a pulse being obtained via a resistance network, adder circuit and threshold value detector if a certain signal waveform occurs. Such filters are for example described in the magazine "I.R.E. Transactions" vol. IT-6, No. 3, June 1960, special issue on matched filters.

Another very simple possibility is shown in FIG. 5. The output terminal 13 of the subtractor circuit is connected to two threshold detectors 14 and 16, the detector 14 having a positive threshold value L+ and the detector 16 a negative threshold value L–. The outputs of the threshold detectors 14 and 16 are connected to monostable multivibrators 15 and 17 respectively, whose outputs are connected to two inputs of a logic circuit 18, which for the signals applied to these two inputs performs an AND-function.

The operation of this circuit will be described with reference to FIG. 6. FIG. 6a shows the signal waveform which is specific of a signal drop-out, which signal is assumed to have appeared at the terminal 13. Moreover, two threshold valves L+ and L– of the two threshold detectors are given by way of example. As soon as the signal at the terminal 13 exceeds the threshold value L+, the threshold detector 14 will trigger the monostable multivibrator 15, so that said multivibrator supplies a pulse $M_1$ at the instant $t_1$. As soon as the signal at the terminal 13 exceeds the threshold value L– the threshold detector 16 triggers the monostable multivibrator 17, so that at the instant $t_2$ this multivibrator supplies a pulse $M_2$. In the Figure it is assumed that the two threshold values L+ and L– have the same absolute value.

The monostable multivibrators 15 and 17 have been designed so that they supply pulses of a duration which is slightly greater than half the period ½$T_o$ of the signal waveform anticipated during a signal drop-out. In FIG. 6 a pulse duration of 0.6 $T_o$ is selected. It can then be seen from the Figure that the two pulses $M_1$ and $M_2$ overlap during the time interval $t_2$—$t_3$, i.e. they are both present during said time interval. Moreover, it can be seen that a certain tolerance in the period $T_o$ of the signal waveform is permissible without said overlap of the two pulses $M_1$ and $M_2$ being lost. When these two pulses $M_1$ and $M_2$ are fed to the AND-gate, this gate will supply a pulse as shown in FIG. 6b at its output during the time interval $t_2$-$t_3$, which pulse indicates the presence of the specific signal waveform and thus of a signal drop-out. Before said pulse at terminal 10 is fed to a signal drop-out compensation device as a control signal, its duration must be adapted to the period $T_0$ with the aid of a monostable multivibrator.

The hold circuit shown in FIG. 5 includes a delay line 19 with a delay of one line time, and a monostable multivibrator 20 whose output signal is applied to a third input of the logic circuit 18, which third input relative to the two other inputs has a NAND-function. Thus it is avoided that after a first pulse at the terminal 10 the second undesired pulse can reach the output terminal 10 after one line time. If said pulses always have mutually the same duration and have a delay of exactly one line time, the monostable multivibrator 20 is in fact redundant. However, to include a certain safety margin, it is advantageous to slightly widen the pulse appearing at the terminal 10, before it is applied to the logic circuit as a hold pulse, so as to ensure that an undesired pulse or a part thereof cannot reach the output terminal 10.

FIG. 6 shows that, as is inherent in the drop-out detector devices in conjunction with the drop-out compensation devices, the signal to be processed will have to be slightly delayed in order to make the beginning of the detection pulse coincide with the actual beginning of the signal drop-out. As usual, this may simply be effected in the usual manner by an appropriate choice of the elements of the signal processing circuits which precede the compensation device.

What is claimed is:

1. A device for detecting signal dropouts in a video signal, which signal comprises a carrier which is frequency-modulated with the luminance information signal, in particular a video signal which is read from a disk-shaped record carrier on which information is stored in optically coded form in a trackwise pattern of blocks and areas of variable length, characterized in that the device includes a first delay line with a delay of one line time connected to receive said read video signal, a first demodulator circuit receiving said video signal for demodulating the luminance information signal contained in the modulated carrier, a second demodulator connected to an output of said first delay line for demodulating the luminance information signal, a substractor circuit for subtracting said demodulated luminance signal and the demodulated luminance information signal which is delayed by one line time with the aid of the first delay line from each other, a signalling circuit to which the output signal of the subtractor circuit is applied and which supplies a signalling pulse at its output if the signal applied to its input within a certain constant time interval passes through a full period of an at least approximately sinusoidal signal, an inhibiting circuit which establishes the connection between the output of the signalling circuit and the output terminal of the device, and a hold circuit whose input is connected to said output terminal and which after the appearance of a signalling pulse at said output terminal supplies a hold pulse with a delay of one line time and a duration substantially equal to that of the signalling pulse, which hold pulse is fed to a control input of the inhibiting circuit, so that during said hold pulse no furthe signalling pulse can reach the output terminal.

2. A device as claimed in claim 1, wherein the hold circuit includes a second delay line with a delay of one line time.

3. A device as claimed in claim 1, wherein the output terminal is connected to a control terminal of a signal drop-out compensation device, which receives the chrominance information of a colour television signal.

4. A device as claimed in claim 1, wherein the first delay line also forms part of a signal drop-out compensation device for the luminance signal contained in the video signal.

5. An apparatus for reading a record carrier provided with a signal drop-out detection device as claimed in claim 1.

6. A device as claimed in claim 1, wherein the signalling circuit includes a correlation circuit, in which the applied signal is continuously compared with a waveform which is stored in a memory, and a signalling pulse is supplied if the applied signal within a certain tolerance corresponds to said stored signal waveform.

7. A device as claimed in claim 6, wherein the hold circuit includes a second delay line with a delay of one line time.

8. A device as claimed in claim 1, wherein the signalling circuit includes a first threshold-value detector with a preset positive threshold value, to which the output signal of the subtractor circuit is applied and whose output is connected to a first monostable multivibrator, a second threshold-value detector with a preset negative threshold value, to which the output signal of the subtractor circuit is applied and whose output is connected to a second monostable multivibrator, and a logic circuit with a first input which is connected to the output of the first monostable multivibrator and a second input which is connected to the output of the second monostable multivibrator, which logic circuit supplies a signalling pulse at its output if simultaneously a pulse appears at each of its two inputs.

9. A device as claimed in claim 8, wherein the hold circuit includes a second delay line with a delay of one line time.

10. A device as claimed in claim 8, wherein the inhibiting circuit forms part of the logic circuit and the control input constitutes an input of said logic circuit.

* * * * *

UNITED STATES PATENT AND TRADEMARK OFFICE

CERTIFICATE OF CORRECTION

PATENT NO. : 3,912,858

DATED : October 14, 1975

INVENTOR(S) : GEORGE CHURCHILL KENNEY

It is certified that error appears in the above-identified patent and that said Letters Patent are hereby corrected as shown below:

IN THE SPECIFICATION

Col. 5, line 3, "$1_{n+1}$" should be --$1_{n-1}$--;

IN THE CLAIMS

Claim 1, line 15, "substractor" should be --subtractor--;

Signed and Sealed this

*tenth* Day of *February 1976*

[SEAL]

*Attest:*

RUTH C. MASON
*Attesting Officer*

C. MARSHALL DANN
*Commissioner of Patents and Trademarks*